US006617402B2

(12) United States Patent
Hernandez-Barajas et al.

(10) Patent No.: US 6,617,402 B2
(45) Date of Patent: Sep. 9, 2003

(54) POLYMER FLOCCULANTS WITH IMPROVED DEWATERING CHARACTERISTICS

(75) Inventors: Jose Hernandez-Barajas, Rennes (CH); Christine Wandrey, Ecublens (CH); David Hunkeler, St. Sulpice (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 0 days.

(21) Appl. No.: 10/097,786

(22) Filed: Mar. 13, 2002

(65) Prior Publication Data
US 2002/0132948 A1 Sep. 19, 2002

Related U.S. Application Data

(63) Continuation-in-part of application No. 09/934,247, filed on Aug. 21, 2001, now abandoned, which is a continuation of application No. 09/406,031, filed on Sep. 27, 1999, now Pat. No. 6,294,622.

(51) Int. Cl.[7] .................................................. C08F 2/16
(52) U.S. Cl. .................... 526/78; 526/87; 526/292.2; 526/317.1; 526/330; 526/319; 526/287; 526/346; 526/329.2; 526/341; 526/303.1; 526/306
(58) Field of Search .................. 526/78, 87, 292.2, 526/317.1, 330, 319, 287, 346, 329.2, 341, 303.1, 306

(56) References Cited

U.S. PATENT DOCUMENTS

| 4,217,262 A | 8/1980 | Coscia et al. |
| 4,720,346 A | 1/1988 | Flesher et al. |
| 4,759,856 A | 7/1988 | Farrar et al. |
| 4,956,399 A | 9/1990 | Kozakiewicz et al. |
| 5,037,863 A | 8/1991 | Kozakiewicz et al. |
| 5,110,864 A | 5/1992 | Robinson et al. |
| 5,354,480 A | 10/1994 | Robinson et al. |
| 5,393,381 A | 2/1995 | Hund et al. |
| 5,413,720 A | 5/1995 | Miller |
| 5,543,058 A | 8/1996 | Miller |
| 5,597,490 A | 1/1997 | Chung et al. |
| 5,601,725 A | 2/1997 | Chung et al. |
| 5,652,292 A | 7/1997 | Stanley, Jr., deceased |
| 5,879,564 A | 3/1999 | Farinato |
| 5,945,494 A * | 8/1999 | Neff et al. ............... 526/292.2 |

FOREIGN PATENT DOCUMENTS

| EP | 0 374 458 A2 | 6/1990 |
| EP | 0 574 335 A1 | 12/1993 |
| FR | 2 589 145 A1 | 4/1987 |
| WO | WO 94/19377 | 9/1994 |

OTHER PUBLICATIONS

*A Concise Review of the Influence of Synthesis and Technological Factors on the Structure and Properties of Polyacrylamides*, D. Hunkeler et al., Industrial Water Soluble Polymers, 1996, pp. 10–27.

* cited by examiner

Primary Examiner—David W. Wu
Assistant Examiner—William K Cheung
(74) Attorney, Agent, or Firm—Alston & Bird LLP

(57) ABSTRACT

A high molecular weight water soluble acrylamide based polymer having improved flocculating and dewatering properties is provided. The polymer is prepared by a process in which a small quantity of a chain branching agent is added to the polymerization reaction mixture continuously or stepwise while the monomers are polymerized. The polymer is useful in solid/liquid separations such as flocculants and coagulants in wastewater treatment applications, and as thickening agents.

40 Claims, 6 Drawing Sheets

POLYMER FLOCCULANTS WITH IMPROVED DEWATERING CHARACTERISTICS

CROSS-REFERENCE TO RELATED APPLICATIONS

This application is a continuation-in-part of U.S. patent application Ser. No. 09/934,247, filed Aug. 21, 2001, abandoned which is a continuation of U.S. patent application Ser. No. 09/406,031, filed on Sep. 27, 1999, which issued as U.S. Pat. No. 6,294,622, both of which are hereby incorporated herein in their entirety by reference.

FIELD OF THE INVENTION

The present invention relates to materials and methods for the preparation of high molecular weight acrylic based water-soluble polymers, and in particular to acrylamide based polymers for use as flocculants, dewatering and thickening agents.

BACKGROUND OF THE INVENTION

Synthetic polymeric materials such as polyacrylamides have long been used as flocculants in wastewater treatment and other processes in which it is desirable to remove suspended solid materials. U.S. Pat. No. 3,235,490 discloses that certain crosslinked acrylamide based polymers are effective flocculants due to an electrostatic attraction followed by a sweeping action of a "filamentary" network provided by the crosslinked polymer. It is also disclosed that the formation of non-homogeneous products, which have a tendency to precipitate from solution, contributes to the effectiveness of the crosslinked polymers.

U.S. Pat. No. 4,720,346 describes a process for producing partially crosslinked acrylamide based cationic and anionic flocculants for use in municipal and industrial wastewater treatment. The crosslinked polymeric material is said to have controlled non-linearity which is caused by crosslinking preformed polymers, or by polymerizing acrylamide monomers in the presence of a crosslinking agent. However, as disclosed therein, the intrinsic viscosity of the water soluble polymers decreases as the concentration of crosslinking agent is increased. Vigorous shearing action is required prior to or during flocculation to make the crosslinked or particulate polymeric material soluble and to increase the intrinsic viscosity. A high dosage of the polymeric material is required for effective removal of solids.

U.S. Pat. No. 4,759,856 describes a flocculation process for removing suspended solids in an aqueous suspension. A polymeric material comprising crosslinked water swellable polymer is added to water to form an aqueous composition, which is in turn added to an aqueous suspension for flocculation. The polymeric material must be subjected to shear during flocculation or in the aqueous composition before adding to the suspension.

Shearing or vigorous stirring of polymeric materials prior to or during flocculation requires process equipment, which is often not available at the wastewater treatment site. The additional shearing and stirring steps inevitably complicate the flocculation process and reduce the cost efficiency.

SUMMARY OF THE INVENTION

This invention provides a high molecular weight water-soluble polymer which exhibits enhanced flocculating or thickening performance in the absence of high shear. This high molecular weight water-soluble polymer is obtained by polymerizing one or more polymerizable monoethylenically unsaturated monomers. The monoethylenically unsaturated monomers in the reaction mixture are polymerized in the presence of a chain branching agent. Specifically, the chain branching agent is added to the reaction mixture continuously or semi-continuously, preferably until the polymerization reaction is substantially completed. The polymerization reaction can be conducted in inverse-emulsion, solution, solution-gel, or by a precipitation polymerization process.

Typically, the chain branching agent is a water soluble multifunctional monomer having at least two unsaturated groups, and is added at a total amount of from about 1 ppm to about $5 \times 10^4$ ppm based on the total amount of the reaction mixture. In a preferred embodiment, N,N-methylene-bis-acrylamide, also referred to as MBA, is used as the chain branching agent at a total amount of from about 1 to about 1000 ppm, preferably from about 2 to about 300 ppm, more preferably from about 4 to about 100 ppm, and most preferably from about 4 to about 25 ppm based on total monomers. The methylene-bis-acrylamide is added continuously or semi-continuously during the polymerization reaction until a total monomer conversion of about 90% is achieved.

Suitable monomers for use in the process of this invention include, but are not limited to, acrylamide, methacrylamide, N-vinyl methyl acetamide, N-vinyl methyl formamide, dialkylaminoalkylmethacrylamide, sulphomethylated acrylamide, vinyl acetate, vinyl pyrrolidone, methacrylic esters, styrene, acrylonitrile, methacrylic acid, itaconic acid, acrylamido methyl propane sulphonic acid, allylsulphonate, sodium vinyl sulphonate, sodium acrylate, diallyldimethylammonium chloride, methacrylamidopropyl trimethylammonium chloride, dialkylaminoalkyl methacrylate, dialkylaminoalkyl acrylate, dialkylaminoalkyl acrylate methyl chloride, and quaternaries or acid salts thereof. At least one of the above monomers is used. Two or more of the above monomers may be copolymerized.

In one aspect of the invention, the polymer of this invention is polyacrylamide, i.e., an acrylamide based high molecular weight water-soluble polymeric material. At least one acrylamide based monomer is normally incorporated into the polymer. For example, a preferred cationic monomer reaction mixture may contain acrylamide and dialkylaminoalkylacrylate (as an acid salt or quaternary salt) in a concentration of at least 30 wt % of the cationic monomer. A preferred anionic monomer system can include acrylamide and methacrylic acid as comonomers and acrylic acid as monomer.

In another aspect of this invention polyacrylamide is used as a flocculant for treating an aqueous suspension such as residential or industrial wastewater. Accordingly, a process for flocculating an aqueous suspension of suspended solids is provided comprising adding to the suspension a flocculating amount of the polymer of this invention, such that an aqueous medium containing flocculated suspended solids is formed. The flocculated suspended solids are then separated from the aqueous medium in a conventional dewatering step, e.g., centrifuge, piston press, or belt press dewatering. Typically the flocculating amount, i.e., the effective dosage, of the polyacrylamide flocculant material of this invention ranges from about 1 to about $10^5$ ppm. The optimal dosage can vary, depending on the solid suspension to be flocculated and the properties of a particular polyacrylamide used. Preferably from about 10 to about 1000 ppm of the polyacrylamide of this invention is used.

While not wishing to be bound by any theory, it is believed that in the polymerization process of this invention, regular branching and/or partial crosslinking along the polymer backbone is achieved as a result of the introduction of the chain branching agent into the reaction mixture in a constant manner or stepwise as a function of time. The polymeric material has increased homogeneity in its chemical structure and network and has sufficiently high intrinsic viscosity. As a result, the polymeric material, exhibits enhanced flocculating performance without being subjected to shearing action.

In addition, it is also believed that, as compared to randomly crosslinked or partially crosslinked polymeric flocculants known in the art, more attachment points are available in the polymer of this invention for attaching onto the solids in the aqueous suspension due to the regularly spaced branching and/or regular partial crosslinking. The polymeric material of this invention is a more facile and efficient flocculant. A significantly lower dosage of the polymeric material of this invention can be employed in a flocculating process while shear action or vigorous stirring either before or during the flocculating process can be avoided. Therefore, the high molecular weight polymer of this invention can exhibit superior sludge dewatering characteristics and improved performance as thickening agents.

As compared to comparable branched polyacrylamide materials prepared by conventional methods, the polyacrylamide material according to this invention exhibits a significantly higher intrinsic viscosity, a lower level of aggregation/association, and a significantly higher weight-average sedimentation coefficient. Typically, the water soluble acrylamide based polymeric flocculant material according to this invention has an intrinsic viscosity (1 M NaCl at 25° C.) of greater than about 2 dl/g, and preferably greater than about 2.5 dl/g. The water soluble acrylamide based polymeric flocculant material of this invention can also exhibit a sedimentation coefficient of the soluble portion of greater than about 5 Svedberg, preferably greater than about 10 Svedberg (measured in 0.05 M NaCl), and an association/aggregation to chain branching agent ratio of less than about 3, preferably less than about 2.5 (measured in 0.005 M NaCl at 25° C.).

Accordingly, this invention provides a water soluble polymer which has regularly spaced branches and/or crosslinks along the polymer backbone. The polymer prepared according to this invention exhibits increased intrinsic viscosity, higher weight-average sedimentation coefficient, and lower aggregation/association than branched flocculating polymers formed from comparable compositions. The polyacrylamide of this invention is especially effective in flocculating suspended solids without shearing.

The foregoing and other advantages and features of the invention, and the manner in which the same are accomplished, will become more readily apparent upon consideration of the following detailed description of the invention taken in conjunction with the accompanying examples, which illustrate preferred and exemplary embodiments.

BRIEF DESCRIPTION OF THE DRAWINGS

FIG. 2(a) does not show any meniscus movement. However, the concentration decreases as a result of a partial sedimentation of associates/aggregates. The separation reaches a limit at approximately 0.6 fringes;

FIG. 2(b) does not show any meniscus movement. In FIG. 2(b), only a small change in concentration is visible implying a very minimal concentration decrease and a high soluble fraction;

FIG. 3 demonstrates that the polymer of Comparative Example 3 (8 ppm MBA, batch addition) exhibits a degree of aggregation higher than the polymer obtained in Example 8 (16 ppm MBA);

FIG. 4(b) shows a higher concentration signal (fringe displacement) than FIG. 4(a). This is related to differences in associated/aggregated regions. For the sample obtained in Comparative Example 3, the aggregation is 45–55%. However, the aggregation is less than 10% for the sample obtained in Example 6. In addition, the sedimentation front is less sharp for the sample obtained in Comparative Example 3. It broadens with time indicating a higher polydispersity/heterogeneity compared with the sample obtained in Example 6.

DETAILED DESCRIPTION OF THE INVENTION

Figure 1:
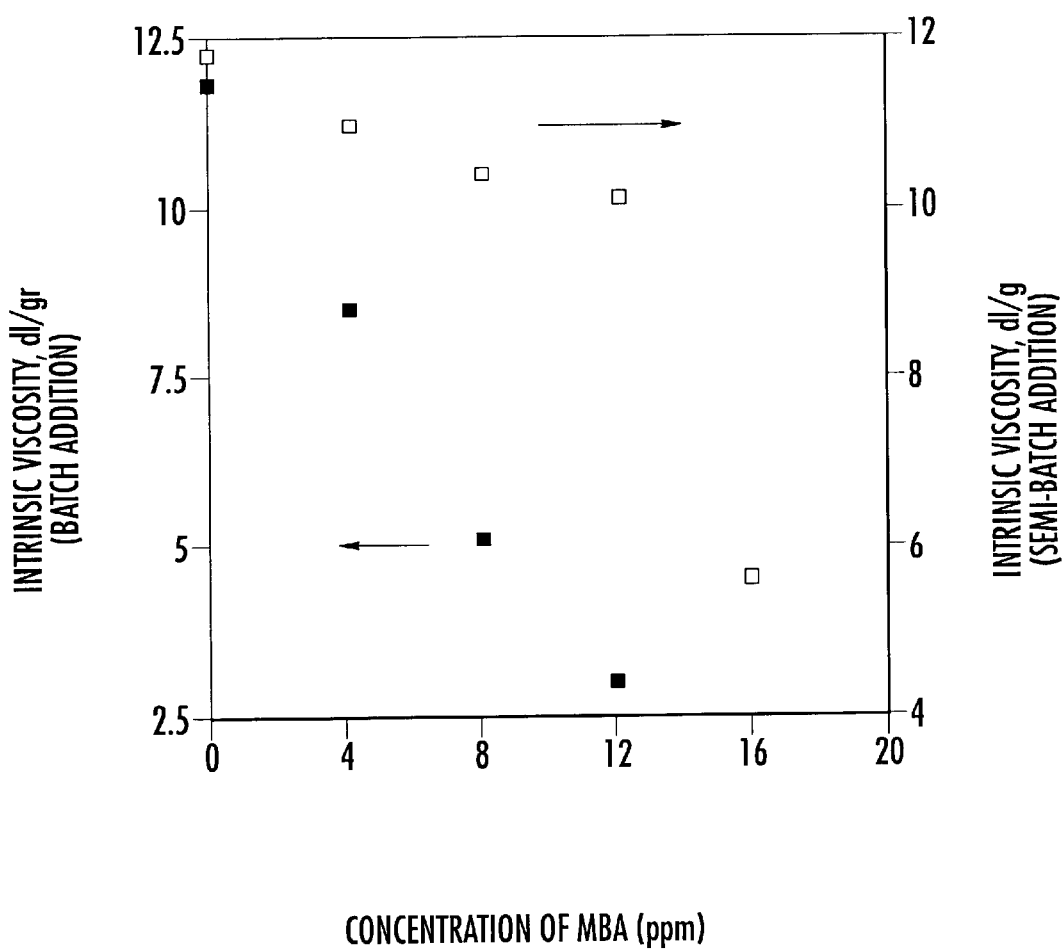
FIG. 1 shows a graph depicting the relationship between the amount of methylene-bis-acrylamide ("MBA") added during polymerization, and the intrinsic viscosity (1 M NaCl at 25° C.) of the resultant polyacrylamides as obtained in Examples 1 through 8.
Figure 2A:
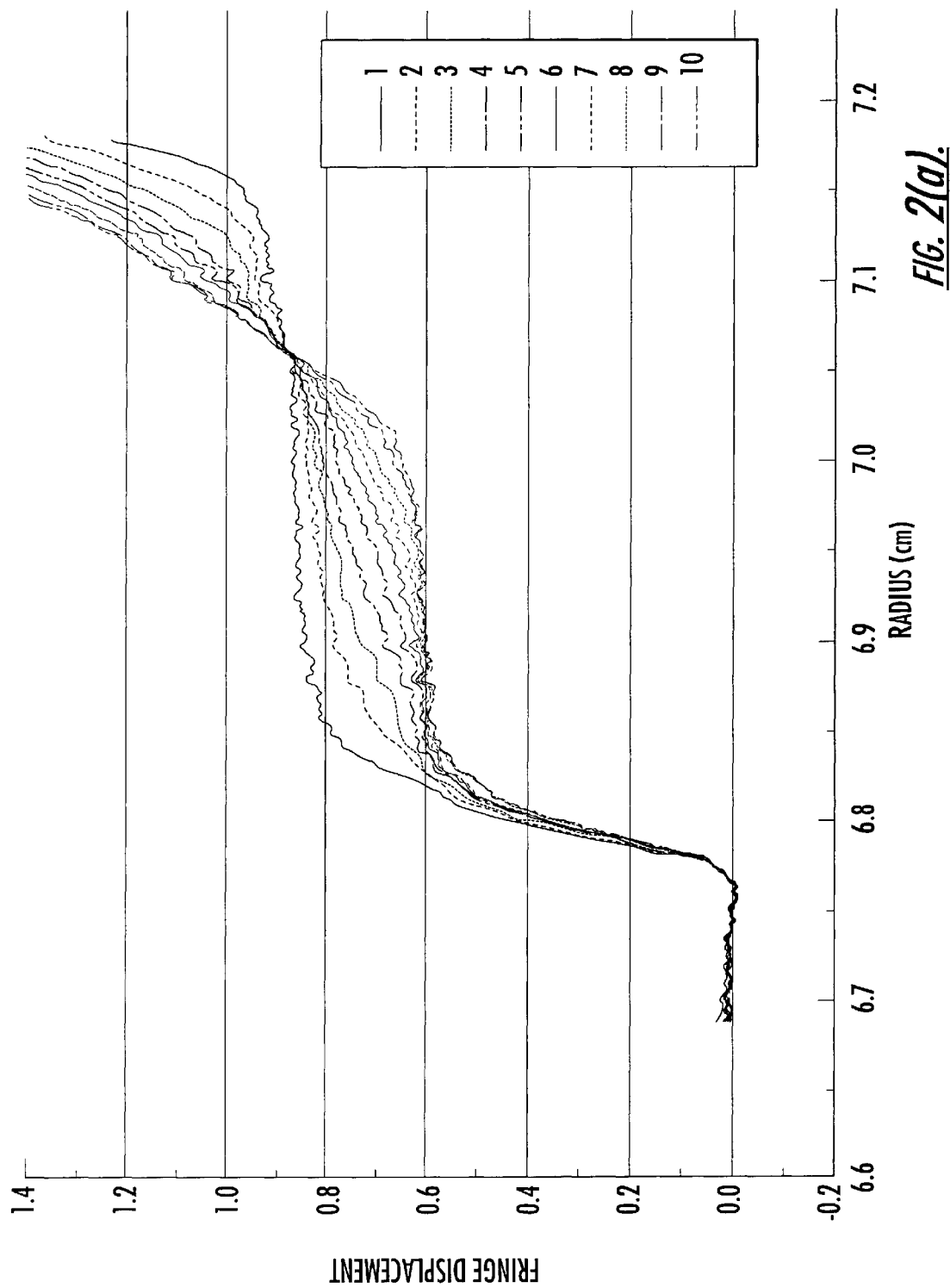
FIG. 2(a) shows the synthetic boundary experiments performed in an analytical ultracentrifuge (Optima XL-I, Beckman at 20° C., 10,000 RPM, delay 10 minutes and 0.005 M NaCl) on samples obtained in Comparative Example 3.
Figure 2B:
FIG. 2(b) shows the synthetic boundary experiments performed in an analytical ultracentrifuge (Optima XL-I, Beckman at 20° C., 10,000 RPM, delay 10 minutes and 0.005 M NaCl) on samples obtained in Example 6.
Figure 3:
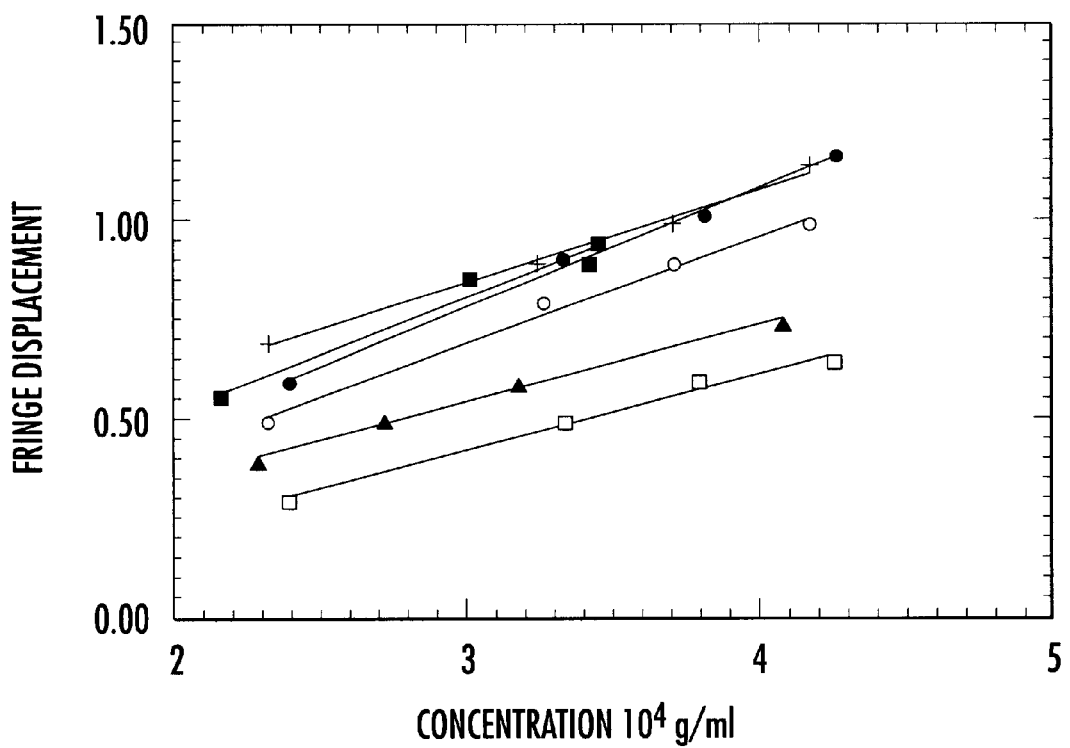
FIG. 3 shows a graph of fringes (a measure of the detected polymer concentration) versus concentration obtained under synthetic boundary experiments using an analytical ultracentrifuge. Examples: +1, ○2, □3, ●5, ■6, ▲8.
Figure 4A:
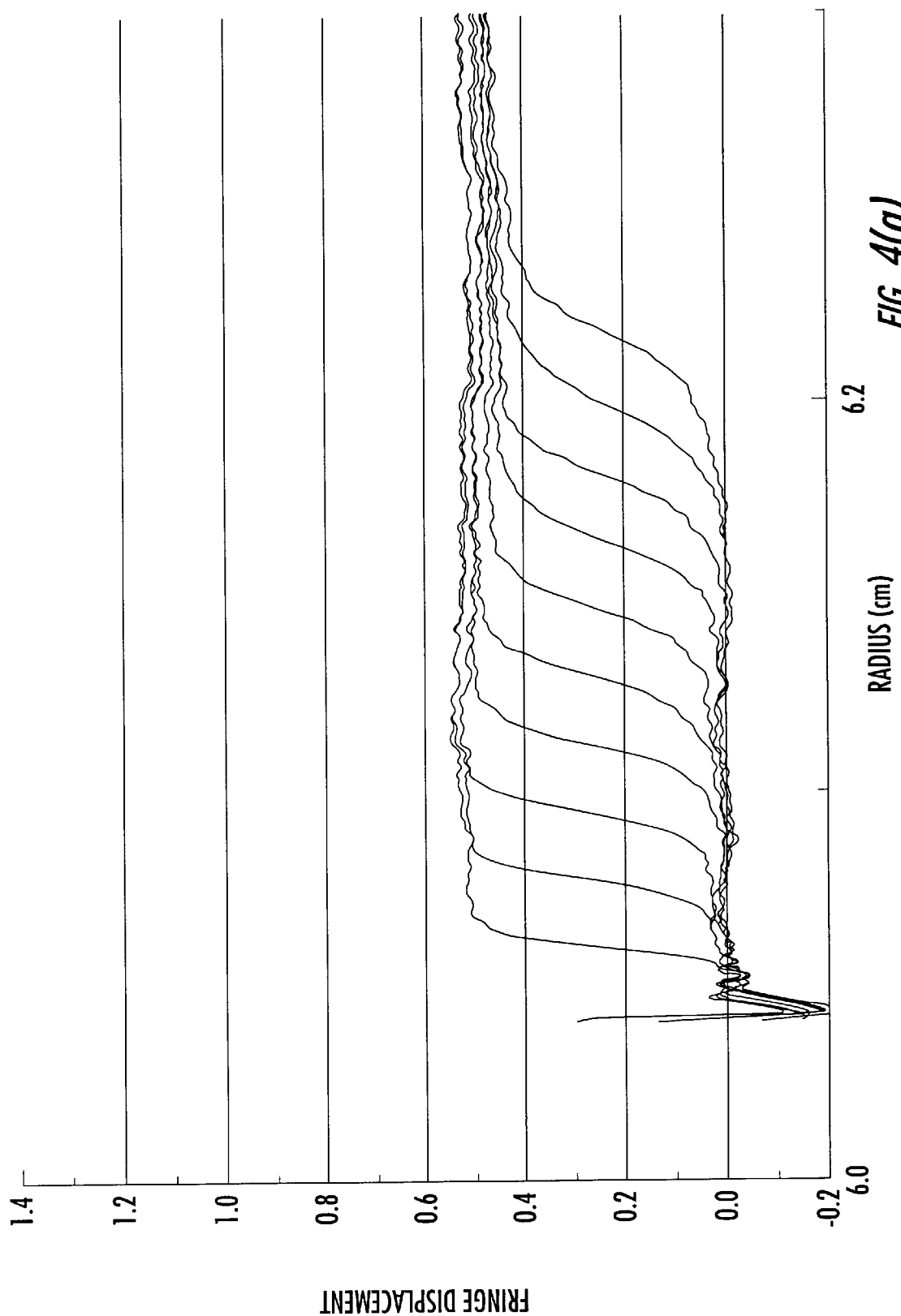
FIG. 4(a) shows the sedimentation profile obtained from a sample of the polymer in Comparative Example 3, in an analytical ultracentrifuge at 20° C., 30,000 RPM, delay 10 minutes and 0.05 M NaCl.
Figure 4B:
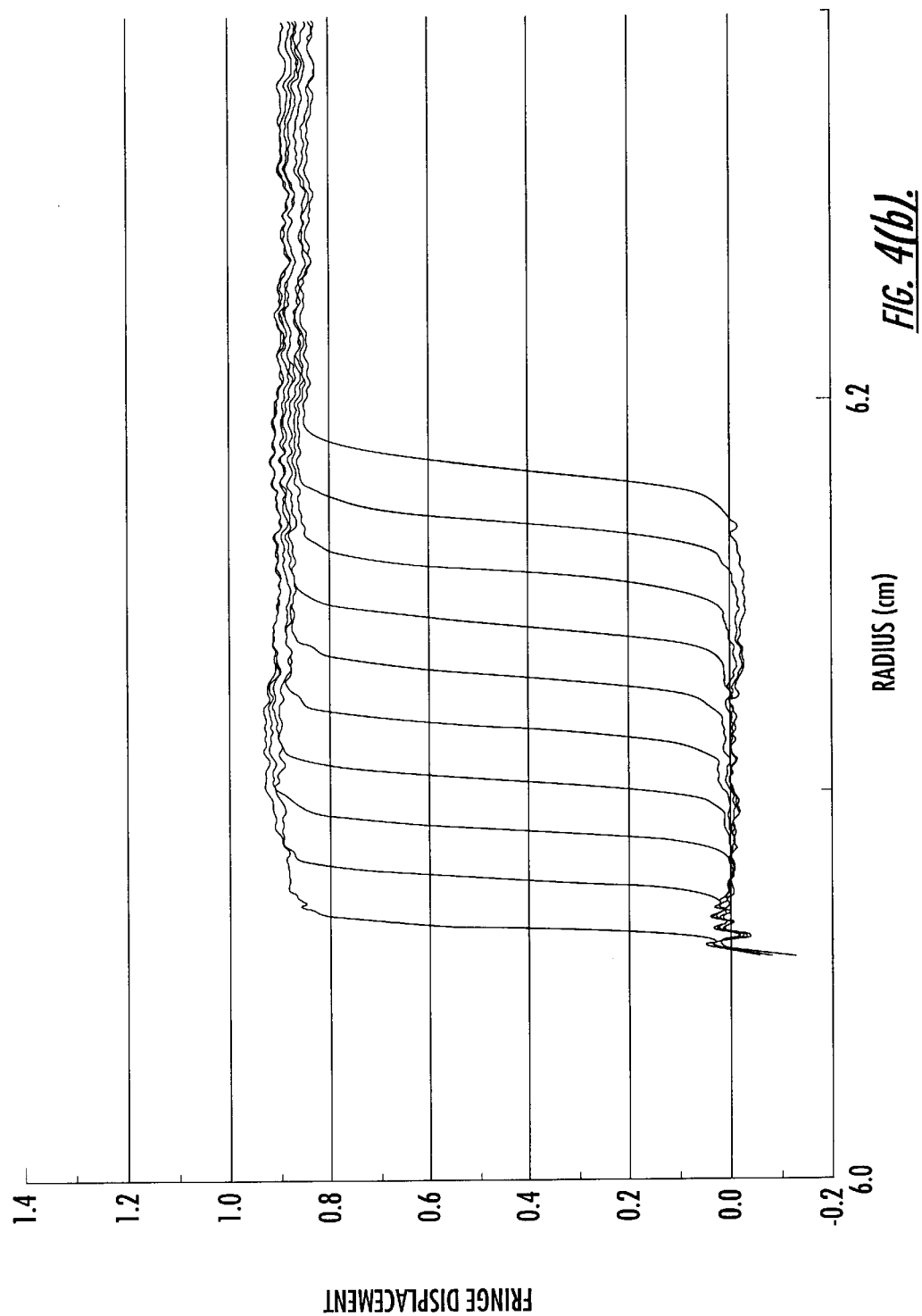
FIG. 4(b) demonstrates the sedimentation profile obtained from a sample of the polymer in Example 6, in an analytical ultracentrifuge at 20° C., 30,000 RPM, delay 10 minutes and 0.05 M NaCl.

The present invention will now be described more fully hereinafter with reference to the accompanying examples, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention provides regularly branched high molecular weight water-soluble polymers from one or more monomers. The polymer exhibits improved flocculating and dewatering characteristics due to the introduction of regularly spaced branches and/or crosslinks as accomplished by the continuous or stepwise addition of small quantities of one or more chain branching agents.

The monomers used for the preparation of the polymeric material of this invention generally include at least one unsaturated alkyl unit, such as one or more monoethylenically unsaturated monomers. The monomers can be alkenes or alkadienes, including olefinic monomers and vinyl monomers. As used herein, the term "olefin" refers to a class of unsaturated aliphatic hydrocarbons having one or more double bonds, generally obtained by cracking petroleum fractions at high temperatures. Exemplary olefinic monomers include ethylene, propylene, isobutylene, 1-butene, and 1-pentene. As used herein, the term "vinyl" monomers refers to compounds including the vinyl grouping (CH2=CH—). Exemplary vinyl monomers include vinyl acetate, acrylates, styrene and the like. The ethylenically unsaturated monomers employed in this invention may further be classified in terms of their ionic character, i.e., as non-ionic, cationic, or non-ionic.

Examples of non-ionic monomers include, but are not limited to, acrylamide, methacrylamide, N-vinylmethylacetamide, N-vinyl methyl formamide, vinyl acetate, vinyl pyrrolidone, methyl methacrylate, methacrylic esters, other acrylic or ethylenically unsaturated esters, styrene, and acrylonitrile. Further exemplary non-ionic monomers include dialkylaminoalkymethacrylamide and sulphomethylated acrylamide.

Examples of cationic monomers are dialkylaminoalkylacrylates and methacrylates, especially dialkylamino ethyl acrylate, and their quaternary or acid salts, and dialkylaminoalkylacrylamides or methacrylamides and their quaternary or acid salts and Mannich products, such as quaternized dialkylaminoethylacrylamides. Alkyl groups are generally $C_{1-4}$ hydrocarbons that may be either branched straight chain. Quaternary salts include quaternary ammonium salts, such as methylated quaternary ammonium salts. For example, the cationic monomers include dimethyl aminoethyl acrylate methyl chloride.

Examples of anionic monomers includes, e.g., acrylic acid, sodium acrylate, sodium methacrylate, ammonium acrylate, ammonium methacrylate, methacrylic acid, itaconic acid, 2-acrylamide 2-methyl propane sulphonate, sulphopropylacrylate or methacrylate or other forms of these carboxylic or sulphonic acids.

One or more of the above monomers may be used in the process for preparing the polymer of this invention. In a preferred embodiment, at least one acrylamide based monomer is used as monomer to prepare a water soluble high molecular weight polyacrylamide having regularly spaced branches along the backbone of the polymer and a low polydispersity of branching. For example, a preferred cationic monomer reaction mixture may contain acrylamide and dialkylaminoalkyl acrylate (as acid salt or quaternary salt) with dialkylaminoalkyl acrylate being at least about 30 wt % of the total monomers. A preferred anionic monomer system can include acrylamide and methacrylic acid as comonomers and acrylic acid as monomer.

A chain branching agent can be incorporated into the process of this invention. As used herein, the term "chain branching agent" means a molecule, typically a polymerizable monomer, which when incorporated in the polymerization reaction for the preparation of the polymer of this invention, is capable of causing the formation of branching side chains along the backbone of the resultant polymer. Although crosslinks in the polymer may also be formed as a result of using the chain branching agent, excessive crosslinking should be avoided.

Typically, a chain branching agent is a water-soluble multifunctional monomer having at least two unsaturated groups. Examples of chain branching agent include, but are not limited to, methylene-bis-acrylamide (which is often referred to as MBA), divinylbenzene, diethylene glycol diacrylate, propylene glycol dimethacrylate, alkyl acrylate, diallylfumarate, trimethylol-propane triacrylate and the like. One or more chain branching agents can be used. Preferably, methylene-bis-acrylamide (MBA) is used as a chain branching agent in the process of this invention.

The one or more chain branching agents can be added to the polymerization reaction continuously or semi-continuously throughout the entire polymerization reaction process or in the period as defined below. The addition of the chain branching agent can begin shortly after the starting of the polymerization reaction, or begin simultaneously with the polymerization reaction. In any event, the addition of the chain branching agent must begin before about 50%, preferably about 25%, more preferably about 10%, most preferably about 5% of the monomer conversion is achieved. The addition of the chain branching agent can be stopped when the polymerization reaction process is substantially completed, i.e., when about 95%, more preferably about 92%, and most preferably about 90% of monomer conversion has been achieved.

The terms "continuously" and "continuous addition" are used herein to mean that the chain branching agent is added at all times throughout the polymerization reaction or during the period as defined above. The terms "semi-continuous", "semi-batch", and "stepwise as a function of the reaction time" are used herein interchangeably. They are used herein to mean that the chain branching agent is added to the polymerization reaction mixture intermittently throughout substantially the entire polymerization reaction process or the above-described duration. For example, the chain branching or chain transfer agent may be introduced in two or more discrete additions after the polymerization reaction has started. As a further example, the chain branching or chain transfer agent may be added in five or more discrete equal additions after the polymerization reaction has started.

Any manner of "continuous addition" or "semi-continuous addition" can be utilized, to produce preferably a regular pattern of branches and/or crosslinks along the backbone of the polymer of this invention. The regularity of the patterns can be embodied in the spacing of the branches and/or crosslinks along the backbone of the polymer, and/or in the length of the branches or crosslink bridges. As used herein, the term "regularity" means that the distances between any two adjacent branching points are the same, or that such distances can change along the backbone of the polymer of this invention in a regular pattern, e.g., increasing or decreasing constantly or cyclically. In addition, the term "regularity" also refers to the lengths of the branches along the backbone of the polymer of this invention, which can be all the same or vary in a predetermined regular pattern along the backbone.

As will be apparent to a skilled artisan, to produce such regularity, the rate of addition of chain branching agent, and/or the time interval between two consecutive additions in the case of "semi-continuous addition," can be controlled in various manners. For example, the rate of addition can increase or decrease at a fixed accelerating or decelerating speed. Another example is that the rate of addition changes in a cyclical manner. In semi-continuous addition, the time intervals can change throughout the polymerization reaction according to a regular pattern.

Preferably, the addition of one or more chain branching agents is "in a constant manner." As used herein, the term "in a constant manner" is intended to mean that in a continuous addition, one or more branching agents are added at the same rate substantially throughout the entire polymerization reaction or the duration as described above, and that in a semi-continuous addition, the addition of one or more chain branching agents is conducted in a manner such that both the time interval between two consecutive addition points and the amount added at each addition point are constant.

The manner of adding at once all of the crosslinking agent or chain branching agent required, typically before the starting of the polymerization reaction, is referred to herein as "batch addition."

The concentration of the chain branching agent should be within the solubility limit of the chain branching agent in the aqueous or oil medium. When the polymerization reaction is conducted in an emulsion, typically it should be calculated in such a way that the aqueous or oil portion to be added in the course of the polymerization does not exceed 5 to 10 weight percent based on the total weight of emulsion.

The rate of addition of the chain branching agent can also vary with the degree of non-linearity desired or the desired final intrinsic viscosity, the total amount of the chain branching agent to be added, and the number of steps employed in the case of semi-continuous or stepwise addition. In addition, as will be apparent to a skilled artisan apprised of this disclosure, in order to form regularly spaced branches and/or crosslinks along the backbone of the polymer, excessive chain branching agent(s) should be avoided. Indeed, the amount of the chain branching agent(s) added in the polymerization should preferably be stoichiometrically limiting, i.e., significantly less than the available polymerization monomers at any given point of time during the polymerization reaction. Otherwise, regularity of branching may not be achieved and the polymers produced may be rendered insoluble and ineffective in flocculating or dewatering applications.

Typically, the total amount of chain branching agent added in the entire polymerization reaction process of this invention may be from about 1 to 1000 ppm, preferably from about 4 to 300 ppm, more preferably from about 4 to 100 ppm, and most preferably from about 4 to 35 ppm based on total monomers. Some minor degree of experimentation may be required to determine the total amount and the best manner of addition of a chain branching agent for a specific branched structure of a polymeric material of this invention, this being well within the capability of one skilled in the art once apprised of the present disclosure.

In alternative embodiments, the molecular weight of the polymer can be controlled by adding of one or more chain transfer agents to the polymerization recipe. The chain transfer agent can generally be present in amounts ranging from about 0.01 to 2.0 weight percent based on the total amount of the reaction mixture or emulsion. Isopropanol can be used as a chain transfer agent in a preferred amount of from about 0.01 to 0.25 weight percent based on the total amount of the reaction mixture or emulsion. Chain transfer agents such as mercaptoethanol, propylene glycol, sodium hypophosphite, thioglycolic acid or lactic acid in preferred amounts of from about 0.01 to 2.0 weight percent based on the total amount of the reaction mixture or emulsion can also be employed.

Inverse emulsion polymerization, e.g., in a water-in-oil emulsion, is a preferred method for preparing the polymer of this invention although other processes, including solution polymerization, solution-gel polymerization and precipitation polymerization, can also be used for the preparation of the polymer of the present invention, as will be apparent to a skilled artisan.

In an inverse emulsion polymerization process, the resultant inverse polymer emulsion may contain a dispersed aqueous phase having the polymer of this invention, and a continuous oil phase formed of a water-immiscible inert organic liquid. In this type of inverse emulsions, the percent of the aqueous phase comprises from about 60 to about 95, preferably from 70 to 80, weight percent of the total emulsion weight. In addition to water, the aqueous phase also contains the monomers to be polymerized in preferred amounts of from about 40 to 60 weight percent based on the total weight of the emulsion. The aqueous phase may further include the chain branching or chain transfer agent. The emulsion polymers of the present invention typically have polymeric particle sizes ranging from about 2 to 5 microns.

The oil phase can be any inert aliphatic and/or aromatic hydrophobic liquid which does not interfere with the polymerization reaction. Examples of these hydrophobic liquids can be benzene, xylene, toluene, mineral oils, isoparaffinic oils, kerosenes, naphtas, and the like, and mixtures thereof. Preferably, the oil phase comprises about 15 to 30 weight % of the emulsion.

The oil phase can also contain water-in-oil surfactants. Such surfactants are well known in the art and are used to promote the formation and stabilization of water-in-oil emulsions. Typically, the surfactants or stabilizers have HLB values in the range of from about 2 to about 10, preferably less than about 7. Examples of these surfactants or stabilizers include, but are not limited to, sorbitan esters of fatty acid, alkanolamides, fatty acid glycerides, glycerine esters, as well as ethoxylated versions of the above and any other well known emulsifers. Advantageously, the stabilizers are non-ionic, such as sorbitan esters of fatty acids and polyoxyethylated sorbitan esters of fatty acids. The water-in-oil surfactants should be used in amounts not greater than about 5 weight percent of the total emulsion. Preferably the amount is not greater than 3%, and most preferably less than about 2.5%.

The polymerization reaction process of this invention can be carried out in the presence of a conventional polymerization initiator. Examples of suitable water-soluble initiators include, e.g., 2,2'-azobis-(2-amidinopropane) dihydrochloride, 4,4'-azobis-(4-cyanopentanoic acid), or redox system such as ammonium persulfate/ferric sulfate. Oil-soluble initiators include, e.g., dibenzoyl peroxide, dilauryl peroxide or tert-butyl peroxide, or azo compounds such as 2,2'-azobisisobutyrate and 2,2'-azobis-(4-methoxy-2,4-dimethylvaleronitrile). combinations and generally in an amount of about 0.015 to 0.5% by weight of the total emulsion.

The polymerization temperature can be selected based on the decomposition kinetics of the initiator used, and may be from about 5° C. to about 100° C. To reduce the residual monomer content, it is also possible to increase the temperature during the course of the polymerization.

Alternatively, it is also possible to use additional initiators during and at the end of the polymerization.

The water-in-oil emulsions of the present invention can be self-inverting or can be inverted with the addition of a wetting agent. These wetting agents can be added to the water-in-oil emulsion or can be added to the water into which the emulsion is introduced. Preferably used wetting agents for inverting the water-in-oil emulsions are ethoxylated nonylphenol having a degree of ethoxylation between 5 to 20 or propoxylate fatty alcohols of 10 to 22 carbons, having a degree of alkoxylation between 5 to 20.

The acrylic based high molecular weight water soluble polymer of this invention typically has a higher viscosity than that of similar polymers resulting from the batch addition of a comparable amount of a comparable chain branching agent. The advantageous Theological properties of this invention are reflected in both the solution viscosity (as determined in highly deionized water at 0.5 wt % active polymer, for example) and the intrinsic viscosity (1 M NaCl at 25° C.). The polymers of this invention typically exhibit an intrinsic viscosity that is at least about 10% higher than the intrinsic viscosity exhibited by a polymer containing substantially identical monomers formed by the batch addition of a substantially identical amount of a substantially identical chain branching or chain transfer agent prior to polymerization, for example. Generally, intrinsic viscosities of greater than about 2 dl/g are provided. Further, exemplary intrinsic viscosities of greater than about 2.5 dl/g and advantageously greater than about 4.0 dl/g can also be provided by the polymers of the invention.

For example, a polymer according to the invention can be provided in which acrylamide is present in an amount of about 60 mol %, dimethylaminoethyacrylate methyl chloride is present in an amount of about 40 mol % and methylene-bis-acrylamide is present in an amount of about 4.37 ppm that exhibits a standard viscosity of greater than about 3.5 cps in 1 M NaCl (0.1 wt % active polymer) at 25° C., preferably greater than about 4.0 cps, and more preferably greater than about 4.5 cps. In a further example, a polymer according to the invention can be provided in which acrylamide is present in an amount of about 80.4 mol %, dimethylaminoethyl acrylate methyl chloride is present in an amount of about 19.6 mol % and methylene-bis-acrylamide is present in an amount of about 8.75 ppm that exhibits a standard viscosity of greater than about 4.5 cps, preferably greater than about 5.0 cps. The polymers of the invention generally exhibit a standard viscosity of greater than about 2.8 cps.

The rate at which the polymer viscosity drops upon the addition of the chain branching agent is also much less severe in this invention than in conventional flocculant systems. A typical standard viscosity drop rate in conventional flocculant polymer systems is about 0.20 cps/ppm chain branching agent. In contrast, the instant invention can provide much less severe standard viscosity drop rates, such as drop rates ranging from about 0.097 to about 0.18 cps/ppm chain branching agent. In one advantageous embodiment, a standard viscosity drop rate of about 0.124 cps/ppm chain branching agent is provided. Polymeric flocculant solutions having higher intrinsic and solution viscosities than previously possible using conventional branched or crosslinked polymeric flocculants are also provided in the invention. Flocculants having an intrinsic viscosity of greater than about 9.0, and advantageously greater than about 10.0, are provided in this invention, for example.

Although not wishing to be bound by theory, Applicants believe that the continuous or stepwise addition of chain branching agent creates a more regular structure within the resulting polymer, yielding a number of beneficial rheological properties. Excessively branched polymers precipitate out of solution, generally reflected by a decrease in viscosity with increasing amounts of chain branching agent. The conventional batch addition of chain branching agents prior to polymerization leads to excessive chain branching during the initial stages of polymerization, causing at least a portion of the polymers to eventually precipitate out of the dispersion. The batch addition of chain branching agents is also expected to give rise to a mixture of heavily branched chains early in the reaction that create a low viscosity component due to the precipitation of these chains, and excessive linear polymer chains later in the reaction that lead to a high viscosity component. The more regular branching pattern occurring along the length of the polymers prepared in accordance with the invention reduces polymer precipitation and provides dispersions having a more uniform viscosity profile. Measurements by analytical ultracentrifuge confirm this hypothesis.

An analytical ultracentrifuge can be used to measure the level of non-linearity of the polymer of this invention. Analytical centrifugation has contributed significantly to the understanding of macromolecular systems since the pioneering work of Svedberg. See T. Svedberg and K. O. Pedersen, *The Ultracentrifuge,* Clarendon Press, Oxford (1940), which is incorporated herein by reference. Since then, analytical ultracentrifugation has been heavily used to characterize properties like average molar masses and molar mass distributions, sedimentation and diffusion coefficients and particles sizes. See *Polymer News,* 23:152 (1998), which is incorporated herein by reference.

Sedimentation velocity and the synthetic boundary experiments can be used in the analytical ultracentrifuge evaluation. In the first experiment, a high centrifugal field is applied to a solution of a polymer dissolved in slightly saline solvents. The polymer moves towards the bottom of the cell. The velocity of the species is dependent on its mass. Polymers with different molar masses are fractionated due to their sedimentation coefficients. In the second experiment, one sector of a special double sector cell is filled half with a polymer solution while the other half contains the solvent. The sectors are connected with a capillary channel. During the acceleration, the solvent layers the polymer solution. The height of the signal "jump" at the synthetic boundary is a measure of the polymer concentration. The decrease of the signal height detects loss of polymer by sedimentation. By using these experiments, truly dissolved polymer can be separated from the undissolved polymer in the form of associate/aggregate and precipitates.

The level of association/aggregation (measured in 0.05M NaCl) observed in the polymer of the present invention is typically below 10%, as compared to the typical 10–55% of the prior art polymers resulting from batch additions of chain branching agents. An association to chain branching or chain transfer agent ratio of less than about 2.5 (measured in 0.005M NaCl at 20° C.) can be provided by the polymers of the present invention, for example.

Additional measurements obtained in the analytical ultracentrifuge also indicate that the molar mass of the polymers of the present invention is higher than that of the polymers resulting from the batch addition of chain branching agent. For the same level of methylene-bis-acrylamide (MBA), the weight-average sedimentation coefficient at zero concentration for the soluble portion is generally above about 6.17 Svedberg, preferably above about 7 Svedberg, more preferably above about 10 Svedberg for the polymers of this invention, as compared to values of generally below about 6.17 Svedberg for the prior art polymers resulting from the batch addition of the chain branching agent as measured in 0.05M NaCl. These characteristics confer the polymers of the present invention superior advantages over the polymers resulting from the traditional batch addition of chain branching agent. (1 Svedberg=$10^{-13}$ second). The polymer prepared in accordance with the present invention exhibits excellent floc stability under shear, low polymer dosages both in belt filter presses and centrifuges, good water release or thickening ability, and low turbidity both in belt filter presses (filtrate) and centrifuges (centrate).

The polyacrylamide material of this invention is particularly useful for flocculating an aqueous suspension of suspended solids. The polymer can be used in wastewater treatment, e.g., municipal, farm, and industrial waste water. In addition, the polymer can also be used in industrial manufacturing, e.g., treating liquid suspensions to remove solids for purposes of e.g., modifying the color, taste, or viscosity of the aqueous suspension. Conventional flocculating methods known in the art can be used for this purpose. Typically, a flocculating process may include the steps of adding to the suspension a flocculating amount of a polyacrylamide flocculant material according to this invention to form an aqueous medium containing flocculated suspended solids. The flocculating amount, i.e., the effective dosage, of the polyacrylamide flocculant material of this invention may range from about 1 to about $10^5$ ppm, preferably from 4 to about $10^4$ ppm, more preferably from about 5 to about 1000 ppm, and most preferably from about 10 to about 600 ppm.

In an alternative embodiment, one or more water soluble, high cationic charge, low intrinsic viscosity coagulant polymers may also be added to the suspension in addition to the flocculant. Mixtures of coagulants and flocculants are discussed in U.S. Pat. No. 6,001,920. The coagulant polymer can be a polyamine based coagulant polymer, such as formed by the condensation of an amine and/or diamine or higher amine with an epihalohydrin or dihalo alkane. Exemplary coagulants can include a monoethylenically unsaturated monomer, such as a coagulant formed by the condensation of epichlorohydrin with dimethylamine and a small amount of ethylene diamine. In further aspects of the invention, the methods of the present invention, introducing a chain branching or chain transfer agent into a polymerization reaction continuously or semi-continuously during polymerization, may be used to increase the structural regularity of coagulant polymers using the materials and methods described above.

The polymers of the present invention are also useful as retention agent, in paper manufacturing. They can be added to the paper finish at the wet end of the paper machine in typical amounts such as about 0.05 to about 7 kilograms of active material per ton of finished paper.

As will be apparent to a skilled artisan, the effective dosage of the polymer composition for flocculating a liquid suspension can vary with the concentration of the solids contained in the liquid suspension to be treated, the chemical and physical structure of the polymer flocculant, and the like. Typically, more polymer is needed when the liquid suspension has a higher concentration of solids, and vice versa. When a polymer of this invention having more regularly spaced branches is used, less amount may be effective as compared to when a polymer having less regularly spaced branches is used. The present invention provides flocculants having an effective dosage of at least 10% less than an acrylic based polymer containing substantially identical acrylic monomers formed by the batch addition of a substantially identical amount of a substantially identical chain branching or chain transfer agent. Some minor degree of experimentation may be required to determine the optimal dosage of a particular polymer of this invention for a particular liquid suspension to be treated, this being well within the capability of one skilled in the art once apprised of the present disclosure. In any event, the flocculating amount, i.e., the effective dosage typically falls within the ranges as described above.

Once an aqueous medium containing flocculated suspended solids is formed, it is dewatered by a conventional dewatering means, e.g., centrifuge, piston press, or belt press dewatering, or simply allowing the solids to precipitate.

The polymers of the present invention are particularly useful in a dewatering process involving belt filter presses and centrifuges. The performance in such equipment can be manifested by increased solids contents in the filter cake and a reduction in turbidity in the filtrate (belt filter presses) and centrate (centrifuges). It has, however, been found that there is a close correlation between flocculant performance in real applications and several laboratory tests such as capillary suction time (CST) and the conventional Buchner Funnel method. CST is measured as described in the *Journal of Institute of Water Pollution Control*, 67:233 (1968). This method involves the addition of a measured dose of flocculant solution to the sludge to be dewatered and applying a defined amount of shear for a measured time. Then, the conditioned sludge sample to be tested is placed in a stainless steel cylinder. The suction pressure of a filter paper beneath the sample cylinder draws out filtrate. The filtrate progresses advances radially in an elliptical pattern. The timer starts when the liquid reaches two electrodes and ceases when the liquid front reaches a third electrode. The best flocculants have the lowest CST values. The conventional Buchner Funnel is used to test the relative effectiveness of various flocculants to dewater a sludge. The test consists of obtaining a representative sludge sample, dividing it into aliquots, adding the desired amount of the polymer being tested, mixing the sludge with the polymer for 10 seconds at 400 rpm, pouring the conditioned sludge into the Buchner funnel with moist filter paper and then determining the drainage time to get a given volume or the filtrate volume after a given time. The best flocculants give the lowest times for a fixed volume or the highest volumes for a fixed time.

The following section summarizes exemplary preparation conditions and characteristics of the polymer flocculants of the present invention.

Comparative Example 1

This example illustrates the formation of a linear 60:40 mol % acrylamide:dimethylaminoethylacrylate methyl chloride quaternary salt copolymer in water-in-oil emulsion. To a vessel equipped with agitation means were added 240 grams of Isopar M, 19.25 grams of sorbitan monooleate, and 5.75 grams of polyoxyethylene sorbitan trioleate as steric stabilizers. The mixture was then stirred rapidly at 300 RPM for 5 minutes. In a separate vessel also equipped with agitation means, the aqueous phase was prepared containing 144 grams of solid acrylamide, 320 grams of 80 wt % dimethylaminoethylacrylate methyl chloride quaternary salt, 0.25 gram of EDTA, 0.12 gram of potassium bromate, 2.0 grams of isopropanol, and 240.92 grams of demineralized water. The aqueous phase was buffered to a pH of 3.5 using concentrated sulfuric acid. The aqueous phase was stirred for 30 minutes at 250 RPM and then transferred slowly to the oil phase. Both phases were pre-emulsified at 300 RPM and then emulsified in a homogenizer at 8000 RPM for 30 seconds. The resulting emulsion was then added to a 1 liter stainless steel reactor equipped with agitation means, an inert gas sparge and a dissolved oxygen probe functioning in hydrophobic continuous phases. The emulsion was continuously sparged using 1 liter per minute of nitrogen. Simultaneously, the temperature of the reaction was gradually ramped up to 40° C. from its starting temperature of about 20° C. (ambient conditions). Once the dissolved oxygen concentration decreased to below 0.2 ppm, 0.11 gram of 2,2-Azobis(4-methoxy-2,4-dimethylvaleronitrile), an organically soluble free radical initiator, dissolved in 2.25 grams of xylene, was added through a septum in the top of the sealed reactor. The polymerization onset was noted by an increase in temperature (exotherm) of 0.2° C. or more under the influence of automatic temperature control. The reaction was maintained at 40° C. for 6 hours. At the end of the 6 hours, the polymerization temperature was increased to 55° C. and 0.23 gram of sodium metabisulfite, dissolved in 0.53 gram of demineralized water, were added to the reactor to reduce the residual acrylamide concentration to below 250 ppm. After cooling, 22.5 grams of ethoxylated nonylphenol were slowly added to the emulsion as an inverting surfactant. The resultant inverse-emulsion contained 40 wt % of active material. The linear polymer in aqueous solution had an intrinsic viscosity of 11.78 dl/g in 1M NaCl and a standard viscosity of 4.53 cps as measured in 1M NaCl (0.1 wt % active polymer) at 25° C. using a Brookfield Programmable DV-11+ with a UL adapter at 60 RPM. These characteristics and parameters from analytical ultracentrifugation experiments are summarized in Table 1.

Comparative Examples 2 Through 4

These examples illustrate the formation of prior art 60:40 mol % acrylamide:dimethylaminoethylacrylate methyl chloride quaternary salt copolymers ("DMAEA") at 40% active material in water-in-oil emulsion, in which MBA is added to the polymerization reaction in a batch manner. These cationic emulsion polymers were obtained using the conditions of Example 1 with the MBA totally added to the aqueous phase before the start of the reaction. The MBA was prepared in demineralized water at a concentration of 288 ppm. An aliquot of this solution was added to the aqueous phase to prepare water-in-oil emulsions of 4, 8 and 12 ppm of MBA, respectively. The intrinsic viscosity, standard viscosity and parameters from analytical ultracentrifugation experiments are also listed in Table I.

TABLE I

Intrinsic viscosity (IV), standard viscosity (SV) and parameters from analytical ultracentrifugation experiments obtained for copolymers of 60:40 mol % acrylamide:DMAEA using MBA (batch addition)

| Example | MBA (ppm relative to monomer) | IV, dl/g | SV, cps | Association/ Aggregation in 0.05 M NaCl, % | Sedimentation Coefficient of the Soluble Portion, Svedberg[1] | Association to MBA ratio |
|---|---|---|---|---|---|---|
| 1 | 0 | 11.78 | 4.53 | 0 | — | — |
| 2 | 4 | 8.49 | 3.82 | 10–20 | 3.73 | 2.5–5 |
| 3 | 8 | 5.07 | 2.98 | 45–55 | 6.13 | 5.6–6.9 |
| 4 | 12 | 2.99 | 2.14 | >60 | — | — |

[1]Svedberg=$10^{-13}$s

EXAMPLES 5 THROUGH 8

60:40 mol % acrylamide:dimethylaminoethylacrylate methyl chloride quaternary salt copolymers were formed at 40% active material in water-in-oil emulsion. These emulsion polymers were obtained under the same conditions as described in Comparative Example 1, except that methylene-bis-acrylamide ("MBA") was added continuously until up to 80–90% total monomer conversion was achieved. Examples 5 through 8 thus contained 4, 8, 12, and 16 ppm of MBA, respectively. The MBA was prepared in demineralized water at a concentration of 288 ppm. The MBA solution was fed to the reactor with a constant-flow rate metering pump at flow rates between 1 to 3.2 ml/hour. The intrinsic viscosity, standard viscosity and parameters from analytical ultracentrifugation experiments are summarized in Table II.

TABLE II

Intrinsic viscosity (IV), standard viscosity (SV) and parameters from analytical ultracentrifugation experiments obtained for copolymers of this invention (60:40 mol % acrylamide:DMAEA)

| Example | MBA (ppm relative to monomer) | IV, dl/g | SV, cps | Association/ Aggregation in 0.05 M NaCl, % | Sedimentation Coefficient of the Soluble Portion, Svedberg[1] | Association/ MBA ratio |
|---|---|---|---|---|---|---|
| 5 | 4 | 9.62 | 4.47 | 0 | 6.17 | 0 |
| 6 | 8 | 10.38 | 4.53 | <10 | 20.2 | <1.25 |
| 7 | 12 | 10.10 | 3.96 | <10 | 9.36 | <0.83 |
| 8 | 16 | 5.61 | 3.01 | 30–40 | 14.3 | 1.9–2.5 |

[1]Svedberg=$10^{-13}$s

EXAMPLE 9

To evaluate the effectiveness of the emulsion polymers of Examples 1–8, CST was measured on activated sludge of the wastewater treatment plant of the city of Orbe, Switzerland for polymers obtained from each of the Examples 1 through 8. The results are shown in Table III. Since the CST of the polymers of the present invention were lower than those of the linear polymer prepared in Example 1 (without MBA), the polymers of the present invention were more effective than the linear polymer. Moreover, the branched polymers of Examples 5, 6, 7 and 8 according to this invention, were also more effective than those obtained by batch addition of MBA, with the polymer of Example 5 providing the best CST at lower doses.

TABLE IV

Conventional Buchner Funnel test of the polymer obtained in Example 5 and a 55:45 acrylamide:dimethylaminoethylacrylate methyl chloride quaternary salt copolymer at 48% active material using an activated sludge sample of the waste water treatment plant of the city of Orbe, Switzerland

| Dose, ppm Polymer Example 5 | Example 5 Time to 40 ml, sec | Dose, ppm Polymer currently used in the waste water treatment plant of Orbe | Currently Used Polymer Time to 40 ml, sec |
|---|---|---|---|
| 4 | 9 | 4.8 | 10 |
| 8 | 9 | 9.6 | 10 |
| 12 | 9 | 14.4 | 10 |
| 16 | 97 | 19.2 | 9 |

TABLE III

CST of polymers obtained in Examples 1 Through 8

| Dose ppm (Polymer) | Example 1 no chain branching agent | Example 2 4 ppm MBA, prior art | Example 5 4 ppm MBA | Example 3 8 ppm MBA, prior art | Example 6 8 ppm MBA | Example 4 12 ppm MBA, prior art | Example 7 12 ppm MBA | Example 8 16 ppm MBA |
|---|---|---|---|---|---|---|---|---|
| 3.99 | 8.3 | 9.0 | 8.5 | 10.0 | 8.9 | 10.8 | 9.7 | 10.2 |
| 7.96 | 10.5 | 9.6 | 8.4 | 9.3 | 8.9 | 9.5 | 8.7 | 10.0 |
| 15.84 | 21.4 | 9.0 | 8.1 | 9.2 | 9.4 | 8.6 | 7.6 | 9.0 |
| 31.37 | 423.4 | 12.7 | 29.9 | 8.1 | 29.8 | 8.2 | 277.5 | 11.4 |
| 47.88 | 270.6 | 28.6 | 50.8 | 12.4 | — | 17.9 | 1034.1 | — |
| 63.84 | — | — | 93.9 | 496.0 | 442.3 | 912.4 | 1179.1 | — |
| 79.80 | — | 158.5 | — | 151.8 | — | — | — | — |

EXAMPLE 10

This example was also carried out to evaluate the effectiveness of polymer of Example 5 as compared to an inverse emulsion copolymer, 55:45 mol % acrylamide:dimethylaminoethylacrylate methyl chloride quaternary salt copolymer at 48% active material. This latter inverse emulsion copolymer is currently used in the waster water treatment plant of the city of Orbe, Switzerland. Table IV shows the results of the evaluation of the Buchner Funnel test performed on an activated sludge sample. The polymer prepared in Example 5 clearly outperformed the polymer currently used in the wastewater treatment plant. Better performance was obtained with the polymer of Examples 5 at lower doses.

EXAMPLE 11

The emulsion polymer of Example 5 was also compared with the cationic powder flocculants Superfloc C-448 and Superfloc C-448 A obtained from Cytec Industries. Table V shows the Buchner Funnel test results of the comparison. An activated sludge sample with 3.54% solids of a wastewater treatment plant of the city of Johannesburg, South Africa was employed in the evaluation. Again, the emulsion polymer of Example 5 showed excellent performance compared with the cationic powders based on the same active material. This would represent considerably economic advantages in using the polymer of Example 5 since the emulsion polymer of Example 5 had 40% active material compared with 95–100% active material of the prior art powder material.

TABLE V

Conventional Buchner Funnel test of the polymer obtained in Example 5 and Superfloc 448-A and 448 (Cytec Industries) using an activated sludge sample of a waste water treatment plant of the city of Johannesburg, South Africa

| Dose, ppm Polymer Example 5 | Example 5 Time to 40 ml, sec | Dose, ppm Superfloc 448-A | Superfloc 448-A Time to 40 ml, sec | Dose, ppm Superfloc 448 | Superfloc 448 Time to 40 ml, sec |
|---|---|---|---|---|---|
| 76 | Very high | 95 | 78 | 95 | 19 |
| 112 | 12 | 140 | 11 | 140 | 9 |
| 145 | 60 | 182 | 21 | 182 | 11 |
| 178 | 77 | 222 | 23 | 260 | 25 |
| 209 | 80 | 260 | 22 | 333 | 53 |

EXAMPLE 12

This example illustrates the scale-up of the preparation of a branched copolymer of acrylamide and dimethylaminoethylacrylate in water-in-oil emulsion with a acrylamide:dimethylaminoethylacrylate methyl chloride quaternary salt molar ratio of 60:40. To a 40 liter stainless steel vessel equipped with agitation were added 5760 grams of Isopar M, 416 grams of sorbitan monooleate and 124 grams of polyoxyethylene sorbitan trioleate as steric stabilizers. The mixture was then stirred rapidly at 300 RPM for 5 minutes. In a 25 liter stainless steel reactor, the aqueous phase was prepared containing 3456 grams of solid acrylamide, 7680 grams of 80 wt % dimethylaminoethylacrylate methyl chloride quaternary salt, 2 grams of EDTA, 4 grams of potassium bromate, 32 grams of isopropanol and 5383 grams of demineralized water. The aqueous phase was buffered to a pH of 3.5 using concentrated sulfuric acid. The aqueous phase was stirred for 30 minutes at 250 RPM to dissolve the solid materials, and then transferred slowly to the oil phase. Both phases were pre-emulsified at 300 RPM for 5 minutes and then emulsified in-a homogeneizer at 3000 RPM for 5 minutes. The resulting emulsion was then transferred back to the 25 liter stainless steel reactor equipped with an inert gas sparge and a dissolved oxygen probe. The emulsion was continuously sparged using 3–5 liter per minute of nitrogen. Simultaneously, the temperature of the reaction was gradually ramped up to 40° C. from its starting temperature of about 20° C. (ambient conditions). Once the dissolved oxygen concentration was below 0.2 ppm, 1.2 grams of 2,2-Azobis(4-methoxy-2,4-dimethylvaleronitrile), dissolved in 3.6 grams of xylene, were added through a septum in the top of the sealed reactor. The polymerization outset was noted by an increase in temperature (exotherm) of 0.2° C. or more under the influence of automatic temperature control. The reaction was maintained at 40° C. for 6 hours. Immediately after the start of the polymerization, MBA solution in demineralized water (200 ppm) was added to the reactor with a constant-flow rate metering pump at a flow rate of 42 ml/hour. The addition of MBA continued until the total monomer conversion was 90%. Therefore, by the end of the polymerization, MBA had been added to the reactor at a concentration of 4.37 ppm based on the total weight of monomers. During the course of the polymerization, additional initiator was injected as necessary to maintain a 20% polymerization rate per hour. At the end of the 6 hours, the polymerization temperature was increased to 55° C. and 21.6 grams of sodium metabisulfite, dissolved in 50.42 grams of demineralized water, were added to the reactor to reduce the residual acrylamide concentration to below 250 ppm. After cooling, 720 grams of ethoxylated nonylphenol were slowly added to the emulsion as an inverting surfactant. The resultant inverse-emulsion contained 40 wt % of active material. The polymer in aqueous solution had a standard viscosity of 4.66 cps as measured in 1M NaCl (0.1 wt % active polymer) at 25° C. using a Brookfield Programmable DV-II+ with a UL adapter at 60 RPM.

EXAMPLE 13

The 60:40 mol % acrylamide:dimethylaminoethylacrylate methyl chloride quaternary salt polymer (40% active material) prepared in Example 12 was compared against 55:45 mol % acrylamide:dimethylaminoethylacrylate methyl chloride quaternary salt polymer (48% active material) in the thickening of activated sludge using a belt filter press of the waste water treatment plant of the City of Orbe, Switzerland. The evaluation was conducted over a two week period. In the first week, the 55:45 mol % acrylamide:dimethylaminoethylacrylate methyl chloride quaternary salt polymer was evaluated while the polymer of Example 12 was evaluated during the second week. Samples were taken to measure weight % dry material in the activated sludge, chemical oxygen demand in the filtrate, weight % dry material in the cake solids and the size of the flocs generated during the evaluation. Table VI shows the results of the evaluation. Reductions up to 28% in polymer doses and larger and more stable flocs were observed with the polymer of Example 12 compared with the 55:45 mol % acrylamide:dimethylaminoethylacrylate methyl chloride quaternary salt polymer (48% active material). Other variables such as thickening and COD are comparable.

TABLE VI

Evaluation results of a 55:45 mol % acrylamide:dimethylaminoethylacrylate methyl chloride quaternary salt polymer (48 % active material) and the polymer obtained in Example 12 using a belt filter press and activated sludge of the waste water treatment plant of the City of Orbe, Switzerland

| Day | Dose, ppm 55:45[1] | Dose, ppm 60:40[2] | % Polymer[3] 55:45 | % Polymer[3] 60:40 | Thickening[4] 55:45 | Thickening[4] 60:40 | COD[5], g/l 55:45 | COD[5], g/l 60:40 | Floc size, mm 55:45 | Floc size, mm 60:40 |
|---|---|---|---|---|---|---|---|---|---|---|
| 1 | 35.6 | | 0.55 | | 6.4 | | 43.5 | | 4 | |
| 2 | 35.6 | | 0.63 | | 7.75 | | 68 | | 4 | |
| 3 | 42.5 | | 0.61 | | 7.3 | | 76 | | 4–5 | |
| 4 | 42.5 | | 0.63 | | 7.95 | | 67.5 | | 4 | |
| 5 | 42.5 | | 0.62 | | 6.5 | | 72 | | 4–5 | |
| 6 | | 28.4 | | 0.45 | | 6.25 | | 81 | | 7–8 |
| 7 | | 28.4 | | 0.47 | | 6.9 | | 62 | | 7–8 |
| 8 | | 24.2 | | 0.63 | | 7.95 | | 67.5 | | 7–8 |
| 9 | | 31.2 | | 0.49 | | 6.5 | | 30 | | 7–8 |
| 10 | | 28.4 | | 0.5 | | 7.1 | | 45 | | 7–8 |

Where:
[1] 55:45 refers to a 55:45 mol % acrylamide: dimethylaminoethyl acrylate methyl chloride quaternary salt polymer (48 % active material).
[2] 60:40 refers to the polymer of Example 12.
[3] % Polymer is the polymer wt % based on the dry solids of the activated sludge, and represents the percentage of active material over the total amount of fresh sludge.
[4] Thickening is the ratio between the cake solids and the solids in the activated sludge, or, stated differently, thickening is the ratio of total solids of the final sludge over the total solids of the fresh sludge.
[5] COD is the chemical oxygen demand of the filtrate.

EXAMPLE 14

A 52:48 mol % acrylamide:dimethylaminoethylacrylate methyl chloride quaternary salt copolymer (40 wt % active material) was prepared following the procedure described in Examples 5 through 8, continuously adding a solution of 800 ppm of MBA in deionized water until the total monomer conversion was 90%. By the end of the polymerization, 17.5 ppm MBA had been added to the reactor, based on the total monomer weight. The resulting polymer had a standard viscosity of 3.88 cps measured in 1 M NaCl (0.1 wt % active polymer) at 25° C. using a Brookfield Programmable DV II+ with a UL adapter at 60 RPM. This polymer was used in the primary treatment stage at the waste water plant of the city of Orbe, Switzerland over a four week period. Samples were taken to measure the chemical oxygen demand (COD) of the inlet and outlet of the primary decanter. Table VII shows the results of this evaluation and compares with the polymer currently used in this waste water treatment facility, a weakly anionic polymer powder commercially available from SNF Floerger. Using comparable doses, the COD removed was higher using the polymer of the present invention.

TABLE VII

Evaluation results of a 52:48 mol % acrylamide:dimethylaminoethylacrylate methyl chloride quaternary salt copolymer (40 wt % active material) and a weakly anionic polymer powder using primary sludge from the waste water treatment plant of the city of Orbe, Switzerland

| Period | Polymer | Dose, g/m³ | COD, inlet, kg/day | COD, outlet, kg/day | % Removal |
|---|---|---|---|---|---|
| Jan.–Feb., 2000 | Currently Used Polymer[1] | 1:31 | 1526 | 1118 | 26.7 |
| May, 2000 | 52:48[2] | 1:30 | 1620 | 885 | 45.4 |

[1] A weakly anionic polymer powder commercially available from SNF Floerger.
[2] 52:48 refers to a 52:48 mol % acrylamide:dimethylaminoethylacrylate methyl chloride quaternary salt copolymer (40 wt % active material) of the present invention.

EXAMPLE 15

A 80.4:19.6 mol % acrylamide:dimethylaminoethylacrylate methyl chloride quaternary salt copolymer (40% active material) was prepared following the procedure described in Examples 5 through 8, continuously adding a solution of 400 ppm of MBA in deionized water until the total monomer conversion was 90%. By the end of the polymerization, the MBA had been added to the reactor at a concentration of 8.75 ppm based on the total monomer weight. The resulting polymer had a standard viscosity of 5.12 cps measured in 1 M NaCl (0.1 wt % active polymer) at 25° C. using a Brookfield Programmable DV-II+ with a UL adapter at 60 RPM. This polymer was used in the dewatering of activated sludge at the waste water plant of the city of Orbe, Switzerland. Samples were taken to measure the dry material at the inlet and outlet of the belt filter. Table VIII shows the results of this evaluation and compares with the polymer currently used in this operation, a moderately cationic polymer emulsion commercially available from SNF Floerger. Reductions of up to 15% in polymer doses were observed during the usage of the polymer of the present invention. The resulting dry material was comparable in both cases.

TABLE VIII

Evaluation results of a 80.4:19.6 mol % acrylamide: dimethylaminoethylacrylate methyl chloride quaternary salt copolymer (40 wt % active material) and a moderately cationic polymer emulsion using primary sludge from the waste water treatment plant of the city of Orbe, Switzerland

| Evaluation Period | Basin | Sludge Flow, m³/h | Polymer | Dose, g/m³ | Dry material, inlet, wt % | Dry material, outlet, wt % |
|---|---|---|---|---|---|---|
| Nov. 13, 2000 | 1 | 15 | Currently used polymer emulsion[1] | 78.5 | 0.66 | 7.0 |
| | 1 | 15 | 80.4:19.6[2] | 68.8 | 0.55 | 7.3 |
| Feb. 1, 2001 | 2 | 15 | Currently used polymer emulsion[1] | 100.9 | 0.73 | 7.1 |
| | 2 | 15 | 80.4:19.6[2] | 86.1 | 0.82 | 7.5 |

[1] A moderately cationic polymer emulsion, commercially available from SNF Floerger.
[2] 80.4:19.6 refers to a 80.4:19.6 mol % acrylamide:dimethylaminoethylacrylate methyl chloride quaternary salt copolymer (40 wt % active material) of the present invention.

EXAMPLE 16

The polymer of Example 15 was evaluated in the primary treatment stage at the waste water treatment of Perroy, Switzerland. The City of Perroy currently uses a weakly anionic polymer emulsion, commercially available from SNF Floerger. Samples were taken to measure the level of the chemical oxygen demand (COD) at the inlet and outlet of the primary decanter. As indicated in Table IX, the efficiency of the COD removal obtained with the polymer of the present invention is much higher than that of weakly anionic polymer powder from the company SNF Floerger.

EXAMPLE 17

The polymer of Example 14 was evaluated in the dewatering of the activated sludge from the waste water treatment plant of the city of Sederot, Israel. Samples were taken to measure the dry material at the outlet of the belt filter. As indicated in Table X, significantly lower doses, higher dry materials and higher outputs were observed in the evaluation of the polymer of the present invention compared with that of the polymer currently used by Sederot, a 50% concentrated highly cationic polymer emulsion commercially available from Ciba Chemical Specialties.

TABLE IX

Evaluation results of a 80.4:19.6 mol % acrylamide: dimethylaminoethylacrylate methyl chloride quaternary salt copolymer (40 wt % active material) and a weakly anionic polymer powder using primary sludge from the waste water treatment plant of the city of Perroy, Switzerland

| Evaluation Period | Polymer | Dose, g/m³ | COD, inlet kg/day | COD, outlet, kg/day | % Removal |
|---|---|---|---|---|---|
| Dec. 1998 | Currently used polymer[1] | 1.29 | 399 | 288 | 27.8 |
| Dec. 2000 | 80.4:19.6[2] | 1.29 | 278 | 108 | 61.2 |

[1] A weakly anionic polymer emulsion, commercially available from SNF Floerger.
[2] 80.4:19.6 refers to a 80.4:19.6 mol % acrylamide:dimethylaminoethylacrylate methyl chloride quaternary salt copolymer (40 wt % active material) of the present invention.

TABLE X

Evaluation results of a 52:48 mol % acrylamide:dimethylamino-
ethylacrylate methyl chloride quaternary salt copolymer (40 wt %
active material) and a 50% concentrated highly cationic polymer
emulsion in the dewatering of activated sludge from the waste
water treatment plant of the city of Sederot, Israel

| Polymer | Sludge flow, m³/hr | Dose, strokes/min | Dry material, wt % |
|---|---|---|---|
| Currently used polymer[1] | 8 | 40 | 16.0 |
| | 13 | 25 | 18.5 |

[1] A 50% concentrated highly cationic polymer emulsion commercially available from Ciba Chemical Specialties.
[2] 52:48 refers to a 52:48 mol % acrylamide:dimethylaminoethylacrylate methyl chloride quaternary salt copolymer (40 wt % active material) of the present invention.

EXAMPLE 18

A 40.5:59.5 mol % acrylamide:dimethylaminoethylacrylate methyl chloride quaternary salt copolymer (40 wt % active material) was prepared following the procedure described in Examples 5 though 8, continuously adding a solution of 800 ppm of MBA in deionized water until the total monomer conversion was 90%. By the end of the reaction, the MBA had been added to the reactor at a concentration of 17.5 ppm based on the total monomer weight. The resulting polymer had a standard viscosity of 3.42 cps measured in 1 M NaCl (0.1 wt % active polymer) at 25° C. using a Brookfield Programmable DV-11+ with a UL adapter at 60 RPM. The polymer was evaluated in the dewatering of activated sludge from the waste treatment facility of Hadera, Israel. Table XI shows the results of the comparison between the polymer of the present invention and the polymer currently used in this waste water treatment facility, a highly cationic polymer powder commercially available from the company Stockhausen. Lower polymer doses and drier materials at the end of the filter were observed using the polymer of the present invention as indicated in Table XI.

TABLE XI

Evaluation results of a 40.5:59.5 mol % acrylamide:dimethylamino-
ethylacrylate methyl chloride quaternary salt copolymer (40 wt %
active material) and a highly cationic polymer powder in the
dewatering of the activated sludge of the waste water treatment
facility of the city of Hadera, Israel

| Polymer | Sludge flow, m³/hr | Dose, L/hr | Dry Material, wt % |
|---|---|---|---|
| Currently used polymer[1] | 9.5 | 1200 | 21.0 |
| 40.5:59.5[2] | 10.0 | 900 | 23.3 |

[1] A highly cationic polymer powder from Stockhausen.
[2] 40.5:59.5 refers to a 40.5:59.5 mol % acrylamide:dimethylaminoethylacrylate methyl chloride quaternary salt copolymer (40 wt % active material) of the present invention.

EXAMPLE 19

A 40.5:59.5 mol % acrylamide:dimethylaminoethylacrylate methyl chloride quaternary salt copolymer (40 wt % active material) was prepared in a 25 liter stainless steel reactor following the procedure described in Example 12, with the exception that the absolute amounts of the various components were scaled up to a 25 liter reactor and the MBA solution was added semi-continuously from the start of the polymerization until the total monomer conversion was around 90%. The outset of the polymerization was defined by a 0.2° C. increase in temperature (exotherm) after the addition of initiator. The MBA was dissolved in demineralized water at a concentration of about 1.0 wt %. The MBA solution was added to the reactor using a disposable syringe inserted through a port in the top of reactor. A total of about 15 grams of the 1.0 wt % MBA solution was added to the reactor in six equally divided portions. MBA injections were made at 0, 1, 2, 3, 4 and 5 hours after the start of the reaction. By the end of the reaction, the MBA had been added to the reactor at a concentration of 15.62 ppm based on the total monomer weight. The resulting polymer had a standard viscosity of 4.04 cps measured in 1M NaCl (0.1 wt % active polymer) at 25° C. using a Brookfield Programmable DV-II+ with a UL adapter at 60 RPM.

EXAMPLE 20

A 40.5:59.5 mol % acrylamide:dimethylaminoethylacrylate methyl chloride quaternary salt copolymer (40 wt % active material) was prepared following the procedure described in Example 19. A total of about 15 grams of a 1.0 wt % MBA solution was added semi-continuously to the reactor in three equally divided portions. MBA injections were made at 0, 3 and 5 hours after the start of the reaction. By the end of the polymerization, the MBA had been added to the reactor at a concentration of 15.62 ppm based on the total monomer weight. The resulting polymer had a standard viscosity of 4.04 cps measured in 1M NaCl (0.1 wt % active polymer) at 25° C. using a Brookfield Programmable DV-II+ with a UL adapter at 60 RPM.

EXAMPLE 21

The resulting polymers from Examples 19 and 20 were evaluated in the dewatering of digested sludge of the waste water treatment plant of the city of Aubonne, Switzerland against a linear 40.5:59.5 mol % acrylamide:dimethylaminoethylacrylate methyl chloride quaternary salt copolymer (40 wt % active material). This copolymer was prepared following the procedure of Comparative Example 1. The resulting linear copolymer had a standard viscosity of 4.3 measured in 1M NaCl (0.1 wt % active polymer) at 25° C. using a Brookfield Programmable DV-II+ with a UL adapter at 60 RPM. Table XII shows that the dewatering time of the copolymers of Examples 19 and 20 is faster than that of the linear product for comparable dry material.

TABLE XII

Evaluation results of several 40.5:59.5 mol % acrylamide:dimethyl-
aminoethylacrylate methyl chloride quaternary salt copolymers
(40 wt % active material) in the dewatering of digested sludge of
the waste water treatment facility of the city of Aubonne, Switzerland

| Polymer | Dose, mg/l | Dewatering time to 50 ml, sec | Dry Material, wt % |
|---|---|---|---|
| Linear | 400 | 63 | 21.5 |
| Copolymer prepared according to Comparative Example 1 | 560 | 205 | 21.0 |
| Copolymer of Example 19 | 400 | 5 | 20.9 |
| | 560 | 9 | 21.7 |
| Copolymer of Example 20 | 400 | 16 | 22.2 |
| | 560 | 10 | 22.5 |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A process for preparing a water soluble polymer, comprising the steps of:

providing a polymerization reaction mixture comprising one or more polymerizable ethylenically unsaturated monomers;

polymerizing the ethylenically unsaturated monomers; and adding to the reaction mixture during polymerization one or more chain branching agents either continuously or semi-continuously, said semi-continuous addition further comprising at least two discrete additions.

2. The process of claim 1, wherein the one or more ethylenically unsaturated monomers are selected from the group consisting of acrylamide, methacrylamide, N-vinyl methyl acetamide, N-vinyl methyl formamide, dialkylaminoalkylmethacrylamide, sulphomethylated acrylamide, vinyl acetate, vinyl pyrrolidone, methacrylic esters, styrene, acrylonitrile, methacrylic acid, itaconic acid, acrylamido methyl propane sulphonic acid, allylsulphonate, sodium vinyl sulphonate, sodium acrylate, diallyldimethylammonium chloride, methacrylamidopropyl trimethylammonium chloride, dialkylaminoalkyl methacrylate, dialkylaminoalkyl acrylate, dialkylaminoalkyl acrylate methyl chloride, quaternary salts thereof, acid salts thereof, and mixtures thereof.

3. The process of claim 1, wherein the chain branching agent is methylenebisacrylamide.

4. The process of claim 1, wherein the one or more chain branching agents are added to the reaction mixture continuously in a constant manner.

5. The process of claim 1, wherein the one or more chain branching agents are added to the reaction mixture semi-continuously in a constant manner.

6. The process of claim 1, wherein the one or more chain branching agents are added to the reaction mixture semi-continuously in at least five discrete additions.

7. A process for preparing an acrylic based polymer, comprising the steps of:

providing a polymerization reaction mixture comprising one or more polymerizable acrylic monomers;

polymerizing said acrylic monomers; and adding to the reaction mixture during polymerization one or more chain branching agents either continuously or semi-continuously, said semi-continuous addition further comprising at least two discrete additions.

8. The process of claim 7, wherein the acrylic monomers are selected from the group consisting of acrylamide, methacrylamide, dialkylaminoalkylmethacrylamide, sulphomethylated acrylamide, and mixtures thereof.

9. The process of claim 7, wherein the reaction mixture further comprises a monomer selected from the group consisting of N-vinyl methyl acetamide, N-vinyl methyl formamide, vinyl acetate, vinyl pyrrolidone, methacrylic esters, styrene, acrylonitrile, methacrylic acid, itaconic acid, acrylamido methyl propane sulphonic acid, allylsulphonate, sodium vinyl sulphonate, sodium acrylate, diallyldimethylammonium chloride, methacrylamidopropyl trimethylammonium chloride, dialkylaminoalkyl methacrylate, dialkylaminoalkyl acrylate, dialkylaminoalkyl acrylate methyl chloride, quaternary salts thereof, acid salts thereof, and mixtures thereof.

10. The process of claim 7, wherein the chain branching agent is methylenebisacrylamide.

11. The process of claim 7, wherein the reaction mixture is in a form of inverse-emulsion.

12. The process of claim 7, wherein the acrylic monomers include acrylamide and said reaction mixture further includes dimethylaminoethylacrylate monomer.

13. The process of claim 7, wherein the one or more chain branching agents are added continuously in a constant manner.

14. The process of claim 7, wherein the one or more chain branching agents are added semi-continuously in a constant manner.

15. The process of claim 7, wherein the one or more chain branching agents are added to the reaction mixture semi-continuously in at least five discrete additions.

16. A process for preparing a water soluble polymer, comprising the steps of:

providing a polymerization reaction mixture comprising one or more polymerizable ethylenically unsaturated monomers;

polymerizing the ethylenically unsaturated monomers; and adding to the reaction mixture during polymerization one or more chain branching agents either continuously or semi-continuously in an amount of from about 1 to about 1000 ppm.

17. The process of claim 16, wherein the one or more chain branching agents are added in an amount ranging from about 4 to about 300 ppm.

18. The process of claim 16, wherein the one or more chain branching agents are added in an amount ranging from about 4 to about 100 ppm.

19. The process of claim 16, wherein the one or more ethylenically unsaturated monomers are selected from the group consisting of acrylamide, methacrylamide, N-vinyl methyl acetamide, N-vinyl methyl formamide, dialkylaminoalkylmethacrylamide, sulphomethylated acrylamide, vinyl acetate, vinyl pyrrolidone, methacrylic esters, styrene, acrylonitrile, methacrylic acid, itaconic acid, acrylamido methyl propane sulphonic acid, allylsulphonate, sodium vinyl sulphonate, sodium acrylate, diallyldimethylammonium chloride, methacrylamidopropyl trimethylammonium chloride, dialkylaminoalkyl methacrylate, dialkylaminoalkyl acrylate, dialkylaminoalkyl acrylate methyl chloride, quaternary salts thereof, acid salts thereof, and mixtures thereof.

20. The process of claim 16, wherein the chain branching agent is methylenebisacrylamide.

21. The process of claim 16, wherein the one or more chain branching agents are added to the reaction mixture continuously in a constant manner.

22. The process of claim 16, wherein the one or more chain branching agents are added to the reaction mixture semi-continuously in a constant manner.

23. The process of claim 16, wherein the one or more chain branching agents are added to the reaction mixture semi-continuously in at least two discrete additions.

24. The process of claim 16, wherein the one or more chain branching agents are added to the reaction mixture semi-continuously in at least five discrete additions.

25. A process for preparing an acrylic based polymer, comprising the steps of:

providing a polymerization reaction mixture comprising one or more polymerizable acrylic monomers;

polymerizing said acrylic monomers; and adding to the reaction mixture during polymerization one or more chain branching agents either continuously or semi-continuously in an amount of from about 1 to about 1000 ppm.

26. The process of claim 25, wherein the one or more chain branching agents are added in an amount ranging from about 4 to about 300 ppm.

27. The process of claim 25, wherein the one or more chain branching agents are added in an amount ranging from about 4 to about 100 ppm.

28. The process of claim 25, wherein the acrylic monomers are selected from the group consisting of acrylamide, methacrylamide, dialkylaminoalkylmethacrylamide, sulphomethylated acrylamide, and mixtures thereof.

29. The process of claim 25, wherein said reaction mixture further comprises a monomer selected from the group consisting of N-vinyl methyl acetamide, N-vinyl methyl formamide, vinyl acetate, vinyl pyrrolidone, methacrylic esters, styrene, acrylonitrile, methacrylic acid, itaconic acid, acrylamido methyl propane sulphonic acid, allylsulphonate, sodium vinyl sulphonate, sodium acrylate, diallyldimethylammonium chloride, methacrylamidopropyl trimethylammonium chloride, dialkylaminoalkyl methacrylate, dialkylaminoalkyl acrylate, dialkylaminoalkyl acrylate methyl chloride, quaternary salts thereof, acid salts thereof, and mixtures thereof.

30. The process of claim 25, wherein the chain branching agent is methylenebisacrylamide.

31. The process of claim 25, wherein the reaction mixture is in a form of inverse-emulsion.

32. The process of claim 25, wherein the acrylic monomers include acrylamide and said reaction mixture further includes dimethylaminoethylacrylate monomer.

33. The process of claim 25, wherein the one or more chain branching agents are added continuously in a constant manner.

34. The process of claim 25, wherein the one or more chain branching agents are added semi-continuously in a constant manner.

35. The process of claim 25, wherein the one or more chain branching agents are added to the reaction mixture semi-continuously in at least two discrete additions.

36. The process of claim 25, wherein the one or more chain branching agents are added to the reaction mixture semi-continuously in at least five discrete additions.

37. A process for preparing a water soluble polymer, comprising the steps of:

(a) providing a polymerization reaction mixture comprising one or more polymerizable ethylenically unsaturated monomers;

(b) polymerizing the ethylenically unsaturated monomers; and (c) adding to the reaction mixture during polymerization one or more chain branching agents either continuously or semi-continuously, wherein the water soluble polymer exhibits a viscosity that is at least about 10% higher than the viscosity achieved by performing the polymerization step (b) with the batch addition of one or more chain branching agents instead of continuous or semi-continuous addition.

38. A process for preparing a water soluble polymer, comprising the steps of:

providing a polymerization reaction mixture comprising one or more polymerizable ethylenically unsaturated monomers;

polymerizing said ethylenically unsaturated monomers; and adding to the reaction mixture during polymerization one or more chain branching agents either continuously or semi-continuously, wherein said water soluble polymer exhibits an intrinsic viscosity of greater than about 2 dl/g in 1M NaCl at 25° C. and a sedimentation coefficient within the soluble portion of greater than about 6.17 Svedberg in 0.05 M NaCl at 20° C.

39. A process for preparing a water soluble polymer, comprising the steps of:

providing a polymerization reaction mixture comprising one or more polymerizable ethylenically unsaturated monomers;

polymerizing said ethylenically unsaturated monomers; and adding to the reaction mixture during polymerization one or more chain branching agents either continuously or semi-continuously, wherein said water soluble polymer exhibits an intrinsic viscosity of greater than about 2.5 dl/g in 1M NaCl at 25° C. and an association to chain branching agent ratio of less than about 2.5 as measured in 0.005 M NaCl at 20° C.

40. A process for preparing a water soluble polymer, comprising the steps of:

providing a polymerization reaction mixture comprising one or more polymerizable ethylenically unsaturated monomers;

polymerizing said ethylenically unsaturated monomers; and adding to the reaction mixture during polymerization one or more chain branching agents either continuously or semi-continuously, wherein said adding step further comprises adding the one or more chain branching agents at a constant rate of between about 0.1 to about 20 weight percent per hour during polymerization, said weight percent based upon the total amount of the one or more chain branching agents added.

* * * * *